United States Patent [19]

Rawson, III et al.

[11] Patent Number: 5,265,252
[45] Date of Patent: Nov. 23, 1993

[54] DEVICE DRIVER SYSTEM HAVING GENERIC OPERATING SYSTEM INTERFACE

[75] Inventors: Freeman L. Rawson, III, Boca Raton; Guy G. Sotomayor, Jr., West Palm Beach; Edward M. Tuggle, Jr., Lantana, all of Fla.

[73] Assignee: International Business Machines Corporation, Armonk, N.Y.

[21] Appl. No.: 675,230

[22] Filed: Mar. 26, 1991

[51] Int. Cl.$^5$ .............................................. G06F 3/00
[52] U.S. Cl. .............................. 395/700; 364/DIG. 1; 364/280.9
[58] Field of Search ................. 364/DIG. 1 MS File, 364/DIG. 2 MS File; 395/275, 500, 650, 700, 800

[56] References Cited

U.S. PATENT DOCUMENTS 4,888,680  12/1990  Sander et al. ................. 395/500
5,029,077  7/1991   Fatahalian et al. ............ 395/700
5,081,577  1/1992   Hatle .......................... 395/725

Primary Examiner—Robert B. Harrell
Attorney, Agent, or Firm—B. D. Jobse; D. R. McKechnie

[57] ABSTRACT

A device driver system comprises a core that manages the specific functions of a plurality of I/O devices. The core includes an operating system interface that is generic to different operating systems. An operating system has a device driver interface that is unique to the operating system. A conversion program is layered between the core and the operating system for converting communications between the device driver interface of the operating system and the generic operating system interface of the core. The core includes a channel manager including a request dispatcher, request queues, a command initiator, and a plurality of state machines corresponding to state machine in the I/O devices. A transport layer interfaces between the hardware and the channel manager.

19 Claims, 3 Drawing Sheets

DEVICE DRIVER SYSTEM HAVING GENERIC OPERATING SYSTEM INTERFACE

FIELD OF THE INVENTION

This invention relates to the field of data processing and, more particularly, to improvements in device driver systems whereby a substantial portion (herein called "core") of a device driver system has a generic operating system interface allowing such core to be used with different operating systems without having to make any substantial changes to the core.

BACKGROUND OF THE INVENTION

By way of background, device drivers are programs or routines which control or manage the flow of data to and from I/O devices. The drivers form part of and interact with other portions of an operating system. An operating system normally includes a basic set of device drivers for I/O devices, such as a keyboard, fixed and floppy disks, display, and printer, commonly used in a personal computer. When an I/O device is added to a data processing system, and such device is not operable under an existing driver, a new driver must be added to the system in order to use the device. Such new driver is customarily supplied by the maker of the I/O device and is installed in the system in accordance with procedures established by the operating system. In personal computers operating with IBM DOS or OS/2 operating systems, such drivers are installed, when the computers are started or rebooted, using commands or instructions in a CONFIG.SYS file.

Typically, device drivers are created for use with a particular operating system. A. M. Mizell, "Understanding device drivers in Operating System/2", IBM Systems Journal, Vol. 27, No. 2, 1988, pp. 170-184, describes the relationships of device drivers to the IBM OS/2 operating system. Such operating system provides multitasking operations in which different programs are able to concurrently use a single device, and one or more programs uses different devices at the same time. Quite obviously, the device drivers and device management routines are quite complex, and they have usually been operating system dependent. A device driver written for one operating system cannot be used with another operating system without extensive modifications.

High performance models of the IBM PS/2 personal computers include a bus designed in accordance with Micro Channel architecture. (IBM, OS/2, PS/2 and Micro Channel are trademarks of International Business Machines Corporation). Such bus is referred to hereinafter as an "MC bus" and provides the means by which additional I/O devices and subsystems can be connected to the personal computers. A SCSI (Small Computer System Interface) bus is a bus designed in accordance with SCSI architecture, and provides a standardized design for the attachment thereto of I/O devices known as SCSI devices, that is, devices specifically designed for attachment to a SCSI bus. SCSI architecture defines a SCSI command set for accessing SCSI devices. A SCSI adapter and a SCSI ABIOS (advanced basic input/output operating system) are commercially available and allow SCSI devices to be connected to PS/2 computers through an MC bus. A device driver system for such SCSI devices is disclosed in U.S. patent application Ser. No. 07/654,441, filed Feb. 12, 1991, for SCSI DEVICE DRIVERS FOR MULTITASKING OPERATING SYSTEM, by D. T. Feriozi Jr. et al, and assigned to the assignee of the invention claimed herein. In the system disclosed in such application, the SCSI device drivers were created specifically for use with OS/2 operating system, and such drivers would have to be greatly modified for use with other operating systems.

SUMMARY OF THE INVENTION

A device driver system can generally be divided into two major parts, one part that interfaces with the operating system, and a second part that interfaces to the hardware and includes the specific information necessary to manage the I/O devices. We estimate that 10 to 20 percent of the development effort for creating new device drivers for use with a different operating system, is consumed by developing the one part, and the remaining 80 to 90 percent is consumed by developing the second part. One of the primary objectives of the invention is to provide a device driver core that is generic to a plurality of different operating systems and can be used with different operating systems without requiring modification. Such system also includes an operating system specific mapping layer for translating communications between a generic operating system interface in the core and a specific device driver interface in the operating system being used. When the core is used with a different operating system, only the mapping layer need be changed thus saving 80-90 percent of the development effort which would otherwise be consumed if an entire device driver system has to be written and developed.

One of the objects of the invention is to provide a device driver system usable with different operating systems without requiring substantial modifications.

Another object of the invention is to provide a device driver system having a core that is generic to different operating systems.

A further object of the invention is to provide a device driver system for handling a great variety of different I/O devices, including SCSI devices, in different operating systems.

Still another object of the invention is to provide a generic device driver core that is usable with different operating systems, and yet allows extensions to be added to the core to accommodate new or different devices and features not provided for by pre-existing device drivers.

Yet another object of the invention is to provide a device driver core having a card state machine including a plurality of logical device state machines modelled after physical device state machines in corresponding I/O devices and which enable the corresponding pairs of logical and physical state machines to interact on a peer-to-peer basis.

Another object of the invention is to provide a device driver core having a transport layer providing for each SCSI adapter card in the system, and providing a set of transport functions usable by the card.

Briefly, in accordance with the invention, a device driver system comprises a core that manages the specific functions of a plurality of I/O devices. The core includes an operating system interface that is generic to different operating systems. An operating system has a device driver interface that is unique to the operating system. A conversion program is layered between the core and the operating system for converting communications between the device driver interface of the operating system and the generic operating system interface of the core.

BRIEF DESCRIPTION OF THE DRAWINGS

Other objects and advantages of the invention will be apparent from the following description taken in connection with the accompanying drawings wherein.

DETAILED DESCRIPTION

Figure 1:
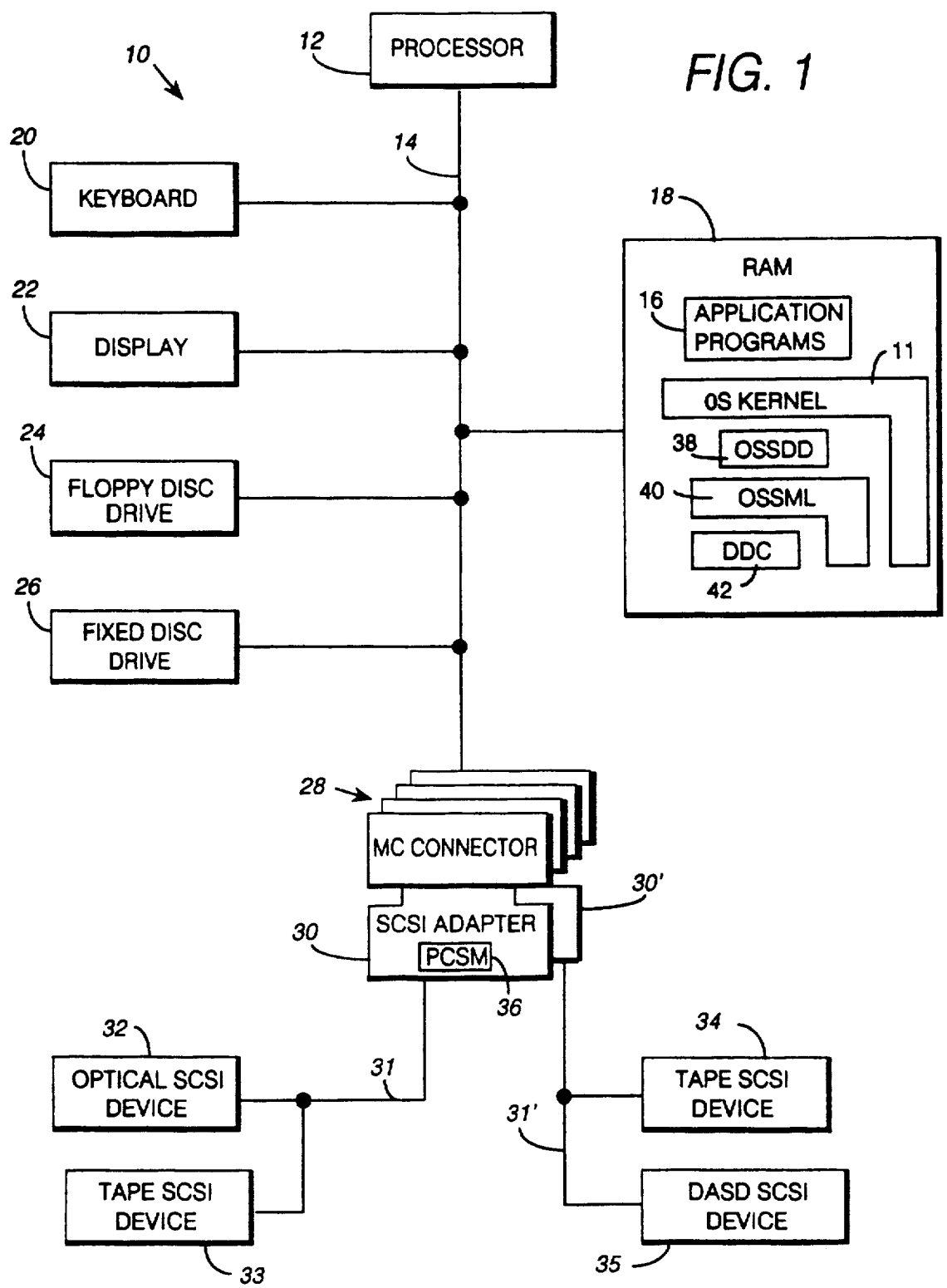
FIG. 1 is a block diagram of a data processing system embodying the invention.

Referring now to the drawings, and first to FIG. 1, there is shown a data processing system 10 operable under an operating system (OS) to execute application programs 16. System 10 comprises a processor 12 connected to a bus system 14 which interconnects other elements of system 10. The other elements include a RAM (random access memory) 18, a keyboard 20, a display 22, a floppy disc drive 24, a fixed disc drive 26, and a plurality of MC (Micro Channel) connectors 28. Two SCSI adapters 30 and 30' are plugged into different ones of connectors 28. Adapter 30 is connected to a SCSI bus 31 that in turn is connected to an optical SCSI device 32 and a tape SCSI device 33. Adapter 30' is connected to another SCSI bus 31' which in turn is connected to a tape SCSI device 34 and to a SCSI direct access storage device (DASD) 35. Adapter 30 includes a physical card state machine (PCSM) 36. Adapter 30' also includes a PCSM (not shown). Quite obviously, the type and number of adapter cards and I/O devices may vary from system to system dependent upon the user's needs and the illustrated system is to be considered exemplary only for purposes of understanding the invention. It is also to be noted that items 30 and 30' are referred to herein synonomously and interchangably with the terms "adapter", "adapter card", and "card".

Application programs 16 are stored in RAM 18 for execution by processor 12. The operating system includes a kernel 11 stored in RAM 18 for execution by processor 12. Also stored in RAM 18 is a three part, device driver system comprising OS specific device drivers (OSSDD) 38, an OS specific mapping layer (OSSML) 40, and a device driver core (DDC) 42. Except for the device driver system, (i.e., items 38, 40, and 42) the other portions of system 10 described above are commercially available so that only so much of the details thereof as may be necessary for an understanding of the invention are described herein. OSSDD 38 comprises a set of device driver routines that are specific to the operating system and provide an interface 46 (FIG. 2) to the OSSML 40 that conforms to the standard interface which the operating system presents to conventional device drivers. DDC 42 bas an interface 48 (FIG. 2) to the operating system which is generic to a plurality of operating systems. OSSML 40 is functionally layered between OSSDD 38 and DDC 42 to convert items passed between the standard operating system device driver interface and the generic device driver operating system interface. DDC 42 is implemented so as to be portable between different operating systems. Thus, should a different operating system be installed in system 10, DDC 42 can still be used but OSSDD 38 and OSSML 40 would have to be replaced to conform to the new operating system.

Figure 2:
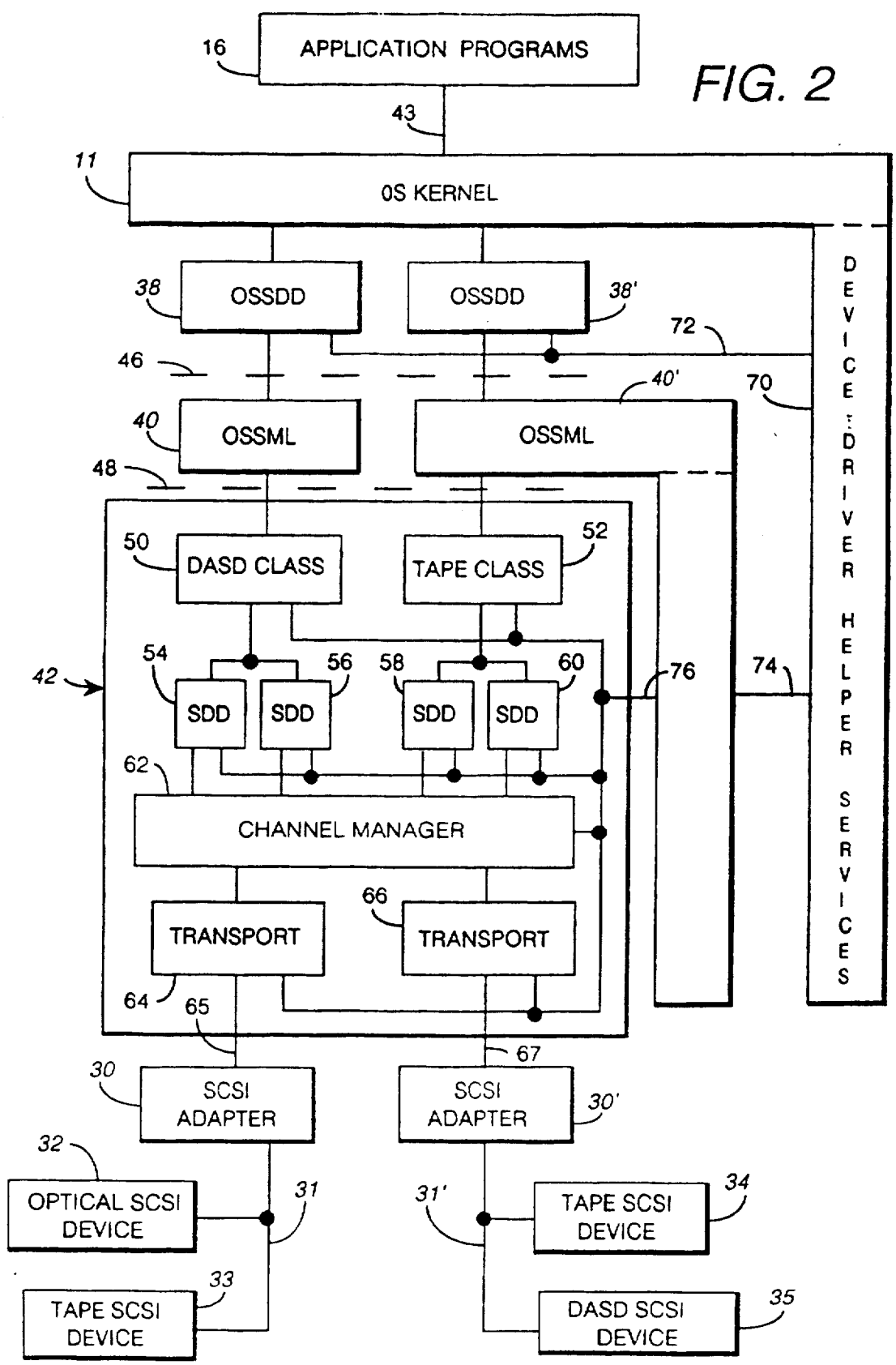
FIG. 2 is a more detailed block diagram of a portion of the system shown in FIG. 1.

Referring to FIG. 2, application programs 16 access I/O devices 32-35 by issuing I/O requests as system calls 43 to the operating system. Such calls are received by OS kernel 11 which interprets the calls and then routes each call to an OSSDD dependent on the device class to which the request is directed. The illustrated system has two SCSI device classes, a DASD class and a tape class. The system thus has two OSSDD 38 and 38' for handling requests for the different classes. The OSSDD issue commands and send data over the standard operating system device driver interface 46 to OSSML which interprets and converts the commands so as to pass over device driver operating system interface 48 to DDC 42. OSSML also has two sections 40 and 40' corresponding to the two classes. Interface 46 includes the following SCSI routines: dev-init, dev-start, dev-stop, dev-rw, dev-reserve, dev-close, dev-format, scsi-find-class, scsi-get-rtns, scsi-register-class, scsi-register-dev-rtns, begin-scsi-io, do-scsi-cmd, scsi-init, scsi-stopdev, get-inquiry, hddoread, hddowrite, and set-classO. Interface 46 also includes interfaces back to the OS kernel, including get-devno, report-err, io-done, and map-io.

DDC 42 includes a plurality of class device drivers 50 and 52 which are respectively generic to the SCSI DASD class and the SCSI tape class. I/O requests received from interface 48 are directed to the appropriate class driver. Four specific device drivers (SDD) drivers 54, 56, 58, and 60 provide driver functions specific or unique to each specific SCSI device. Drivers 54 and 56 provide specific driver functions for optical SCSI device 32 and DASD SCSI device 35. Drivers 58 and 60 provide specific driver functions for tape devices 33 and 34. The two specific tape devices might be, for example, a 4 mm tape drive and an 8 mm tape drive requiring slightly different SDDs. DDC 42 further includes a channel manager 62 and a transport layer including a plurality of transport routines 64 and 66, there being one transport routine for each SCSI adapter in the system.

OS kernel 11 also includes device driver help services 70 that are called by different routines in the device driver system. Since OSSDD 38 is operating system specific, services 70 are called directly by calls 72. However, routines in DDC 42 issues calls 76 that are generic to such operating system services, and OSSML 40 translates such calls into calls 74 that are specific to the operating system. Such calls are generally for extraction routines to obtain information from the OS.

Figure 3:
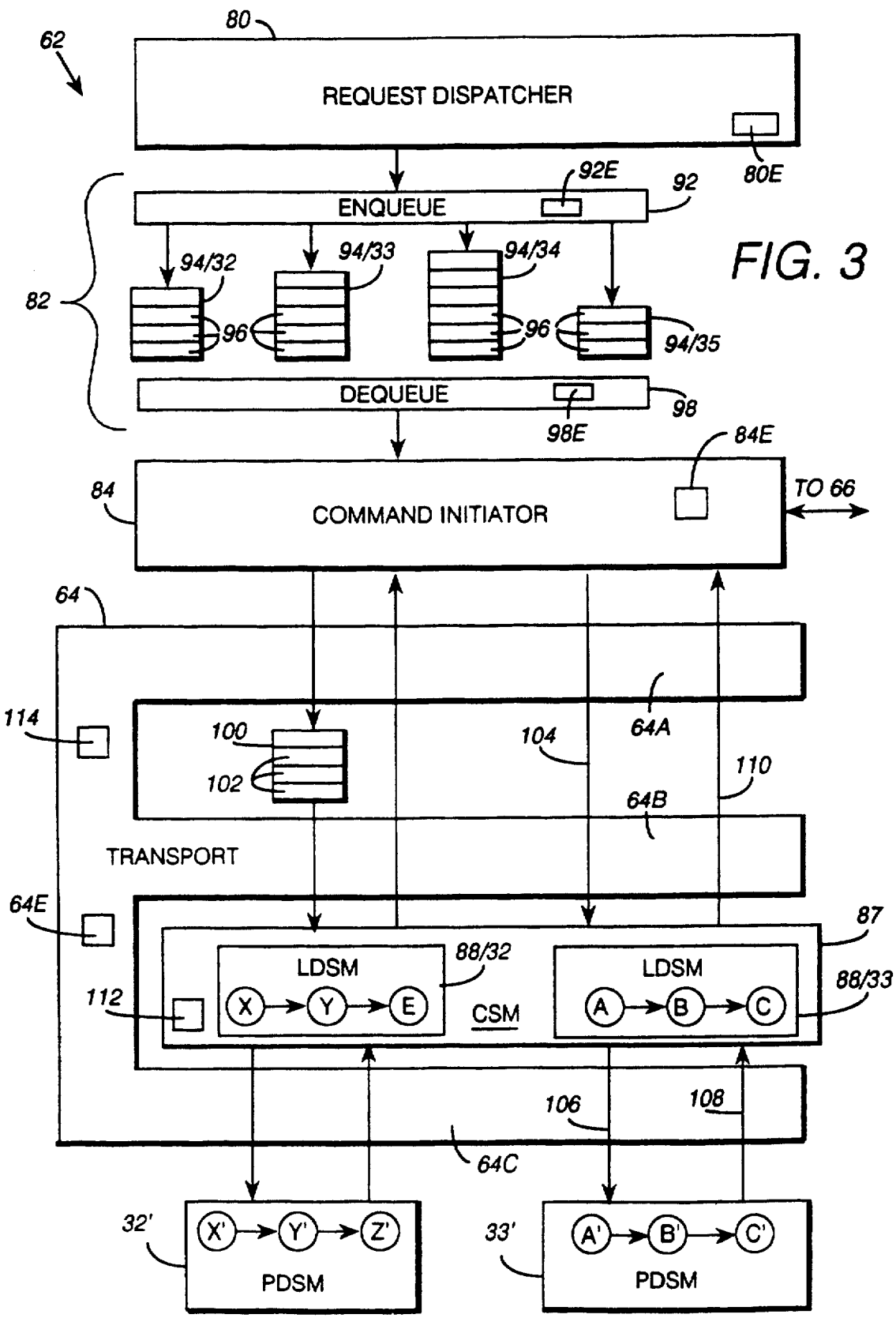
FIG. 3 is a more detailed block diagram of the operating system independent device driver shown in FIG. 1.

FIG. 3 shows the relationship of further details of channel manager 62 to the transport layer and to state machines. Channel manager 62 comprises a request dispatcher 80, request queues 82, a command initiator 84, and a logical card state machines (CSM) 87. Channel manager 62 receives I/O requests in request dispatcher 80. When plural requests are received at about the same time, the requests are stacked internally in dispatcher 80 and then serviced one at a time. Dispatcher 80 determines which SCSI device the request is for, performs any function that needs to be done before enqueing, builds a generic request block, and dispatches the request block to the corresponding device queue 82.

Device queue 82 comprises three parts, an enqueue function 92, a plurality of device request queues 94/n (where "n" identifies the associated I/O device), and a dequeue function 98. Each request queue is composed of individual request blocks 96. When a request block 96 is received from dispatcher 80, enqueue function 92 places the request block on the queue 94 corresponding the I/O device for which the request has been made. Dequeue function 98, in response to receiving a message from command initiator 84 to transmit the next request block for a particular device, removes a request block 96 from a queue and transmits it to the requestor. The dequeuing function can be done in a variety of ways such as FIFO (first-in, first-out), priority levels, etc.

Command initiator 84 translates request generic blocks 96 received thereby into SCSI specific request blocks 102 that are then transmitted through one of transport layers 64 or 66 to a system state machine for the device to which the I/O request is directed. Command initiator builds one or more SCSI commands from each generic request or optimizes a plurality of generic requests into a single SCSI command. For example, multiple sequential disk reads can be optimized into a single SCSI read command. Since the transport layers are similar, only layer 64 is shown in FIG. 3 for simplicity of illustration. Communications with layer 66 occurs through the paths shown at the right edge of initiator 84.

CSM 87 is logically the same as PCSM 36 and contains a card data structure 112 which among other items discussed below, includes information on the state of the corresponding PCSM. CSM also includes a plurality of logical device state machines (LDSM) 88. There is one LDSM 88 for each I/O device in the system and the LDSMs are associated with the transport layer corresponding to the card to which the I/O devices are connected. Thus, LDSMs 88/32 and 88/33 interact with transport layer 64, since devices 32 and 33 are connected to adapter 30 which layer 64 corresponds to. Transport layer 64 is symbolically E-shaped and has three sublayers 64A-64C through which the various requests and messages pass. A request from initiator 84 is receiver by sublayer 64A which determines if the number of simultaneous requests being handled by the associated adapter exceeds the maximum number that the adapter can handle at any given time. If the adapter is too busy, the excess requests 102 are placed in a card request queue 100 until such time as they can be processed. If the adapter is not busy, the request is transmitted along path 104 to sublayer 64B which determines if there is any pending request in an associated queue 100. If there is no pending request for a device, the current request is then transmitted to the appropriate LDSM 88.

CSM 87 and LDSMs 88 are formed in memory 18 and are paired with and form models of corresponding physical device state machines (PDSMs). The PDSMs are the actual I/O devices which perform real I/O operations, and comprise the internal latches, registers, and signals representing the physical state of the machine, and the device logic which responds to such stimuli for controlling operation of the device. Specifically, as shown in FIG. 3, LDSM 88/32 is a model of PDSM 32' and LDSM 88/33 is a model of PDSM 33'. Each logical and physical state machine recognizes the state the device is in and in response to a stimulus switches to another state dependent on the previous state and the nature of the stimulus. Thus, by way of example, suppose PDSM 33' has three states A', B', and C'. The corresponding LDSM 88/33 also has three states A, B, and C corresponding to states A'-C'. Each LDSM is paired with PDSM and the paired state machines communicate with each other by messages transmitted through transport sublayer 64C. The paired state machines are arranged for peer-to-peer control, as opposed to master/slave control, to provide novel functions and advantages set forth below.

Using the example of the previous paragraph, a typical operation begins when command initiator 84 sends a message (the request) along 104 to LDSM 88/33. This causes such state machine to switch from state A to state B. Part of this transition is to send a message or command to PDSM 33' via path 106 which causes the device to go from state A' to state B'. Path 106 traverses transport sublayer 64C which builds the necessary command or control block for controlling operation of SCSI device 33. Such control block is sent along path 106. When device 33 completes the desired operation, PDSM 33' switches from state B' to state C'. Part of this transition is to send a response (results of command) back to LDSM 88/33 along path 108. Upon receipt of this message (results) LDSM 88/33 switches from state B to state C. Part of this transition is to send a message (results) via path 110 back to the command initiator, which can then get a new request from queue 94/33. Note that a LDSM does not have to always be the initiator of a request. A device and PDSM can also be an initiator. This implies that asynchronous processing can take place.

Such state machine interaction provides several important functions and advantages. Synchronous devices (i.e., disks, tape) and non-synchronous devices (i.e., LAN and other communication devices) can be attached to the same bus/adapter combination. The state machine interaction allows for a symmetric relationship between synchronous processor driven devices (i.e., disks) and asynchronously driven devices (communication devices). Missing interrupt tracking is simplified for synchronous devices. In the corresponding state machine, there could be timed transitions. Such transitions allow solving the problem of when more buffers need to be allocated for communication devices. Symmetric state modeling allow an inboard device to manage the state of any outboard cache that may exist. Many of these functions are possible because all levels of the channel manager are extensible by device specific code. Standard code can be used and new code only needs to be written and developed for the areas of a device that are not covered by code in an existing subsystem.

Contained in each CSM is a card data structure 112 the details of which vary from machine to machine in accordance with the details of the associated device. Each card data structure contains the following fields of information:

Field information 1 card identifier information- all information that describes the particular adapter card, i.e., I/O ports, memory mapped address, etc.
2 Error information- place for storing error codes when an error occurs.
3 Card state- indicates current state the card is in, i.e., not initialized, not present, reset, error recovery procedure (ERP), initializing, busy, and broken.
4 Flags- used to modify some of the behavior of the code for the card, mostly set when the card has been initialized.
5 Device state pointer- points to device state array.
6 Transport function pointer- points to transport function for the card.

7 Work queue- queue of work for card to perform that is not on behalf of any device (device I/O requests are not on this queue).

All active state information about a card and the devices attached thereto are maintained off of the card state data structure 112. Such structures are maintained as an array of structures. The card number is used as an index into the array to access an individual structure for a particular card. By convention, on a PS/2 computer, the slot that a particular card is plugged into is used as the physical card number.

Transport functions 114 are provided in the transport layers and are stored as a linked list, there being one transport function 114 for each type of adapter. The transport functions include data and routines including a pointer to next transport function in list, card identifier, presence test routine, initialization card routine, interrupt routine, output command routine, reset routines, allocate command block routine, free end block routine, build command block routines, process card work queue routine, get status block routine, process command error routine, restart I/O routine, modify command block routine, and error reporting routines.

When system 10 is initialized, each transport function is scanned until one is found to match the card being initialized. A match is found by using a combination of the card identifier field and by calling the presence test routine. When a match is found, a pointer to the individual transport function is placed in the appropriate card state structure. This permits fast access to the transport function for a particular card. Several card state structures may point to a specific transport function if there are several of the same type of adapter cards in the system.

Since several card state structures 112 can point to a particular transport function, the specifics for each card are kept in the card state structure as part of the card identifier. The transport function 114 in its card identifier field keeps the generic information for that type of card (i.e., a list of all possible I/O ports that control registers may appear at). The transport function isolates the specifics as to how an individual card performs some function. This is not to be mistaken for a BIOS operation. The transport functions are mainly focused on specific delivery of commands to the card and responses back from the card. The transport functions are stateless in that all state information as to what activity is being performed is kept at higher levels. The transport function is called to perform some very specific functions on the card.

When I/O devices are added to the system and DDC 42 needs to be modified to control such devices, such modifications can be included in code extensions which can be placed in one or more of the different portions of DDC 42 as appropriate. Thus, code extensions (indicated by the E suffix) can be placed as extensions 80E to request dispatcher, extensions 92E and 98E to enqueue and dequeue functions 92 and 96, extensions 84E to the command initiator, and extensions 64E to transport layer 64. Extensions can also be made to the logical state machines. For example, suppose device 32 has three state X', Y' and Z' so that PDSM includes such states and when it was added to the system, an LDSM existed having only two states X and Y. LDSM 88/32 was for-med by adding an extension corresponding to state Z.

It should be apparent to those skilled in the art that many changes can be made in the details and arrangements of steps and parts without departing from the scope of the invention as defined in the appended claims.

What is claimed is:

1. A data processing system (DPS) comprising:
   a memory system for storing application programs and an installed operating system, said operating system having a specific device driver interface for communicating with device drivers specifically designed for said operating system;
   a processor for executing said programs;
   a plurality of I/O devices;
   a generic device driver core having a generic operating system interface generic to a plurality of different operating systems including said installed operating system, said core being portable between different operating systems and having a plurality of device specific device drivers connected to said I/O devices for controlling operation of said I/O devices;
   and conversion means functionally layered between said specific device driver interface of said installed operating system and said generic operating system interface of said device driver core, for converting I/O requests and responses between said specific device driver interface of said operating system and said generic operating system interface of said device driver core, to thereby adapt said generic device driver core to operate specifically with said installed operating system.

2. A data processing system in accordance with claim 1 wherein said device driver core further comprises:
   a channel manager operable to receive I/O requests from said installed operating system, queue said requests, and translate said requests into specific commands for said I/O devices;
   and a transport layer interfacing between said channel manager and said I/O devices.

3. A data processing system in accordance with claim 2 wherein:
   said I/O devices comprise a plurality of physical device state machines (PDSMs);
   and said channel manager comprises a plurality of logical device state machines (LDSMs) each corresponding to a different one of said PDSMs and being paired therewith for communicating between each state machine in each pair.

4. A data processing system in accordance with claim 3 wherein:
   each pair of an LDSM and a PDSM are arranged for peer-to-peer control whereby such LDSM can cause such PDSM to transit states by sending a command thereto, and such PDSM can cause such LDSM to transit states by sending a command thereto.

5. A data processing system in accordance with claim 4 wherein:
   said data processing system includes an adapter card for connection to a plurality of said I/O devices, said adapter card comprising a physical card state machine;
   and said channel manager comprises a logical card state machine modeled after said physical card state machine.

6. A data processing machine in accordance with claim 5 wherein:
   said transport layer comprises a plurality of sublayers and said logical state machines are sandwiched between said sublayers, whereby all I/O requests pass through said sublayers before reaching said logical state machines.

7. A data processing system in accordance with claim 6 wherein one of said sublayers is operative to determine, when an incoming I/O request is being sent to an I/O device attached to said adapter card, whether said adapter card is busy because it is currently handling a predetermined number of I/O requests, such one sublayer being further operative to place said incoming I/O request on a card request queue until when the number of I/O requests being handled by said card falls below said predetermined number.

8. A data processing system in accordance with claim 2 wherein said channel manager comprises:
   a plurality of request queues for temporarily storing I/O requests, there being one request queue for each I/O device;
   a request dispatcher for receiving I/O requests and dispatching such requests to one of said request queues according to which device each request is for.

9. A data processing system in accordance with claim 8 wherein said channel manager further comprises:
   a plurality of logical state machines for controlling operation of said I/O devices;
   a command initiator operable to receive I/O requests from said request queues and translate each request to a specific I/O command which is then sent to one of said state machines to operate one of said I/O devices in accordance with such specific I/O command.

10. A data processing system in accordance with claim 9 wherein:
    said data processing system includes a SCSI bus, and said I/O devices are SCSI devices connected to said SCSI bus.

11. A data processing system in accordance with claim 10 wherein:
    said data processing system comprises an adapter card connected to said SCSI bus and containing a physical card state machine (PCSM);
    said channel manager comprises a logical card state machine (LCSM) corresponding to said PCSM, said LCSM containing a card state data structure settable to indicate a present state of said PCSM.

12. A data processing system in accordance with claim 11 wherein:
    said transport layer comprises a transport function including routines for interfacing with said I/O devices;
    and said card data structure contains a pointer to said transport function.

13. A data processing system in accordance with claim 2 wherein:
    said channel manager comprises extension routines for extending operation of said channel manager beyond preexisting limits.

14. A data processing system in accordance with claim 1 wherein:
    said I/O devices comprise a plurality of physical device state machines (PDSMs); and
    said DPS further comprises a plurality of logical device state machines (LDSMs) each corresponding to a different one of said PDSMs and being paired therewith for communicating between each state machine in each pair.

15. A data processing system in accordance with claim 14 wherein:
    each pair of an LDSM and a PDSM are arranged for peer-to-peer control whereby each LDSM can cause the paired PDSM to transit states by sending a command thereto, and each PDSM can cause the paired LDSM to transit states by sending a command thereto.

16. A data processing system in accordance with claim 15 wherein said DPS further comprises:
    an adapter card for connection to a plurality of said I/O devices, said adapter card comprising a physical card state machine; and
    a logical card state machine modeled after said physical card state machine.

17. A data processing machine in accordance with claim 16 wherein:
    said transport layer comprises a plurality of sublayers and said logical state machines are sandwiched between said sublayers, whereby all I/O requests pass through said sublayers before reaching said logical state machines.

18. A data processing system in accordance with claim 17 wherein one of said sublayers is operative to determine, when an incoming I/O request is being sent to an I/O device attached to said adapter card, whether said adapter card is busy because it is currently handling a predetermined number of I/O requests, such one sublayer being further operative to place said incoming I/O request on a card request queue until when the number of I/O requests being handled by said card falls below said predetermined number.

19. A data processing system in accordance with claim 1, wherein:
    said device driver core further comprises a plurality of I/O class device drivers covering different classes of I/O devices installed within said data processing system; and
    said device specific device drivers being layered under said class device drivers according to device class.

* * * * *